United States Patent
Morimoto et al.

(10) Patent No.: US 12,031,866 B2
(45) Date of Patent: Jul. 9, 2024

(54) COLORIMETER, COLORIMETRIC SYSTEM, AND COMMUNICATION METHOD

(71) Applicant: SEIKO EPSON CORPORATION, Tokyo (JP)

(72) Inventors: Keiichi Morimoto, Nagano (JP); Hiroyuki Ouchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 33 days.

(21) Appl. No.: 17/705,515

(22) Filed: Mar. 28, 2022

(65) Prior Publication Data

US 2022/0316947 A1 Oct. 6, 2022

(30) Foreign Application Priority Data

Mar. 30, 2021 (JP) .................... 2021-056393

(51) Int. Cl.
*G01N 21/25* (2006.01)
*G01J 3/02* (2006.01)
(Continued)

(52) U.S. Cl.
CPC .............. *G01J 3/50* (2013.01); *G01J 3/0264* (2013.01); *G01N 21/251* (2013.01); *H04L 67/125* (2013.01)

(58) Field of Classification Search
CPC .... G01J 3/46; G01J 3/50; G01J 3/0264; G01J 3/027; G01J 3/0272; G01J 3/26; G01J 3/463; G01N 21/251; H04W 76/15; H04W 4/80; H04W 84/12; H04W 88/06; H04L 67/125; H04L 69/18
See application file for complete search history.

(56) References Cited

U.S. PATENT DOCUMENTS 5,402,361 A * 3/1995 Peterson ............ G01N 21/5907
382/167
6,043,894 A * 3/2000 Van Aken ................ G01J 3/46
356/402
(Continued)

FOREIGN PATENT DOCUMENTS

CN 203798452 U * 8/2014 ................ G01J 3/28
JP 2020-071083 A 5/2020
(Continued)

*Primary Examiner* — Roy M Punnoose
(74) *Attorney, Agent, or Firm* — Global IP Counselors, LLP

(57) ABSTRACT

A colorimeter includes: a colorimetric section that performs colorimetry; a first wireless communicating section that performs first wireless communication according to a first wireless communication standard; a second wireless communicating section that performs second wireless communication according to a second wireless communication standard; and a processor that controls the first wireless communicating section and the second wireless communicating section. The processor transmits colorimetric data acquired by the colorimetry in the first colorimetric mode by the first wireless communication when colorimetry in a first colorimetric mode is performed. The processor also transmits colorimetric data acquired by the colorimetry in the second colorimetric mode by the second wireless communication when colorimetry in a second colorimetric mode is performed.

12 Claims, 11 Drawing Sheets

(51) Int. Cl.
  *G01J 3/50* (2006.01)
  *H04L 67/125* (2022.01)

(56) References Cited

U.S. PATENT DOCUMENTS

| | | | | |
|---|---|---|---|---|
| 6,338,030 | B1 * | 1/2002 | Senn | G01J 3/027 |
| | | | | 356/213 |
| 6,519,050 | B1 * | 2/2003 | Eintracht | H04N 1/62 |
| | | | | 358/1.9 |
| 7,728,845 | B2 * | 6/2010 | Holub | H04N 23/13 |
| | | | | 345/589 |
| 8,570,517 | B2 * | 10/2013 | Horita | G01J 3/46 |
| | | | | 356/402 |
| 9,544,712 | B2 * | 1/2017 | Matsumoto | H04W 4/80 |
| 9,872,222 | B2 * | 1/2018 | Oyabu | H04W 48/16 |
| 10,165,141 | B2 * | 12/2018 | Hayashi | H04N 1/00002 |
| 10,230,872 | B2 * | 3/2019 | Konishi | B41J 2/2146 |
| 2003/0223060 | A1 * | 12/2003 | Graf | G01J 3/504 |
| | | | | 356/319 |
| 2004/0109161 | A1 * | 6/2004 | Stranzl, Jr. | G01J 3/462 |
| | | | | 356/425 |
| 2005/0116942 | A1 * | 6/2005 | Vander Jagt | G01J 3/506 |
| | | | | 345/207 |
| 2006/0109458 | A1 * | 5/2006 | Watanabe | G01J 3/50 |
| | | | | 356/243.4 |
| 2012/0208514 | A1 * | 8/2012 | Park | H04W 4/023 |
| | | | | 455/418 |
| 2015/0187327 | A1 * | 7/2015 | Francis | G06F 1/163 |
| | | | | 345/589 |
| 2017/0347362 | A1 * | 11/2017 | Nakahara | H04L 41/12 |
| 2019/0154566 | A1 * | 5/2019 | Ast | A61B 5/7225 |
| 2019/0204156 | A1 * | 7/2019 | Matsumoto | G01N 35/00871 |
| 2020/0070539 | A1 * | 3/2020 | Kobayashi | B41J 2/2103 |
| 2020/0136886 | A1 | 4/2020 | Tanimura | |
| 2021/0144210 | A1 * | 5/2021 | Kolhapure | H04L 41/0226 |

FOREIGN PATENT DOCUMENTS

| | | | | |
|---|---|---|---|---|
| JP | | 2022127868 A | * 9/2022 | G01J 3/462 |
| WO | WO-2020223257 A1 | * 11/2020 | | B01L 3/502715 |

* cited by examiner

COLORIMETER, COLORIMETRIC SYSTEM, AND COMMUNICATION METHOD

The present application is based on, and claims priority from JP Application Serial Number 2021-056393, filed Mar. 30, 2021, the disclosure of which is hereby incorporated by reference herein in its entirety.

BACKGROUND

1. Technical Field

The present disclosure relates to a colorimeter, a colorimetric system, and a communication method.

2. Related Art

Colorimeters that perform colorimetry for a target such as a print are known. The colorimeters are used in various places, for example, at business negotiations in a meeting room, and at inspection of a printing factory and thus, are desirably used in a cable-less manner. For example, JP-A-2020-71083 discloses a colorimeter that is connectable to a personal computer via a wireless LAN. In JP-A-2020-71083, the colorimeter is connected to the personal computer by one mode of wireless communication.

Some colorimeters can perform colorimetry in a plurality of colorimetric modes. However, there has not been proposed a method of achieving wireless communication suitable for the colorimetric mode of such colorimeter.

SUMMARY

An aspect of the present disclosure is related to a colorimeter including: a colorimetric section that performs colorimetry; a first wireless communicating section that performs first wireless communication according to a first wireless communication standard; a second wireless communicating section that performs second wireless communication according to a second wireless communication standard; and a processing section that controls the first wireless communicating section and the second wireless communicating section, in which the processing section, when colorimetry in a first colorimetric mode is performed, transmits colorimetric data acquired by the colorimetry in the first colorimetric mode by the first wireless communication, and when colorimetry in a second colorimetric mode is performed, transmits colorimetric data acquired by the colorimetry in the second colorimetric mode by the second wireless communication.

Another aspect of the present disclosure relates to a colorimetric system including the above described colorimeter, and a terminal device that communicates with the colorimeter.

Another aspect of the present disclosure is related to a communication method of a colorimeter, the method including when colorimetry is performed in a first colorimetric mode using a colorimetric section of the colorimeter, transmitting colorimetric data acquired by the colorimetry in the first colorimetric mode by first wireless communication, the first wireless communication being wireless communication according to a first wireless communication standard, when colorimetry is performed in a second colorimetric mode using the colorimetric section, transmitting colorimetric data acquired by the colorimetry in the second colorimetric mode by second wireless communication, the second wireless communication being wireless communication according to a second wireless communication standard.

BRIEF DESCRIPTION OF THE DRAWINGS

FIG. 8 is a diagram illustrating a screen after turn-on.

DESCRIPTION OF EXEMPLARY EMBODIMENT

The present embodiment described below does not unreasonably limit contents described in claims. All of the configurations described in the present embodiment are not always essential constituent elements.

1. Colorimeter

Figure 1:
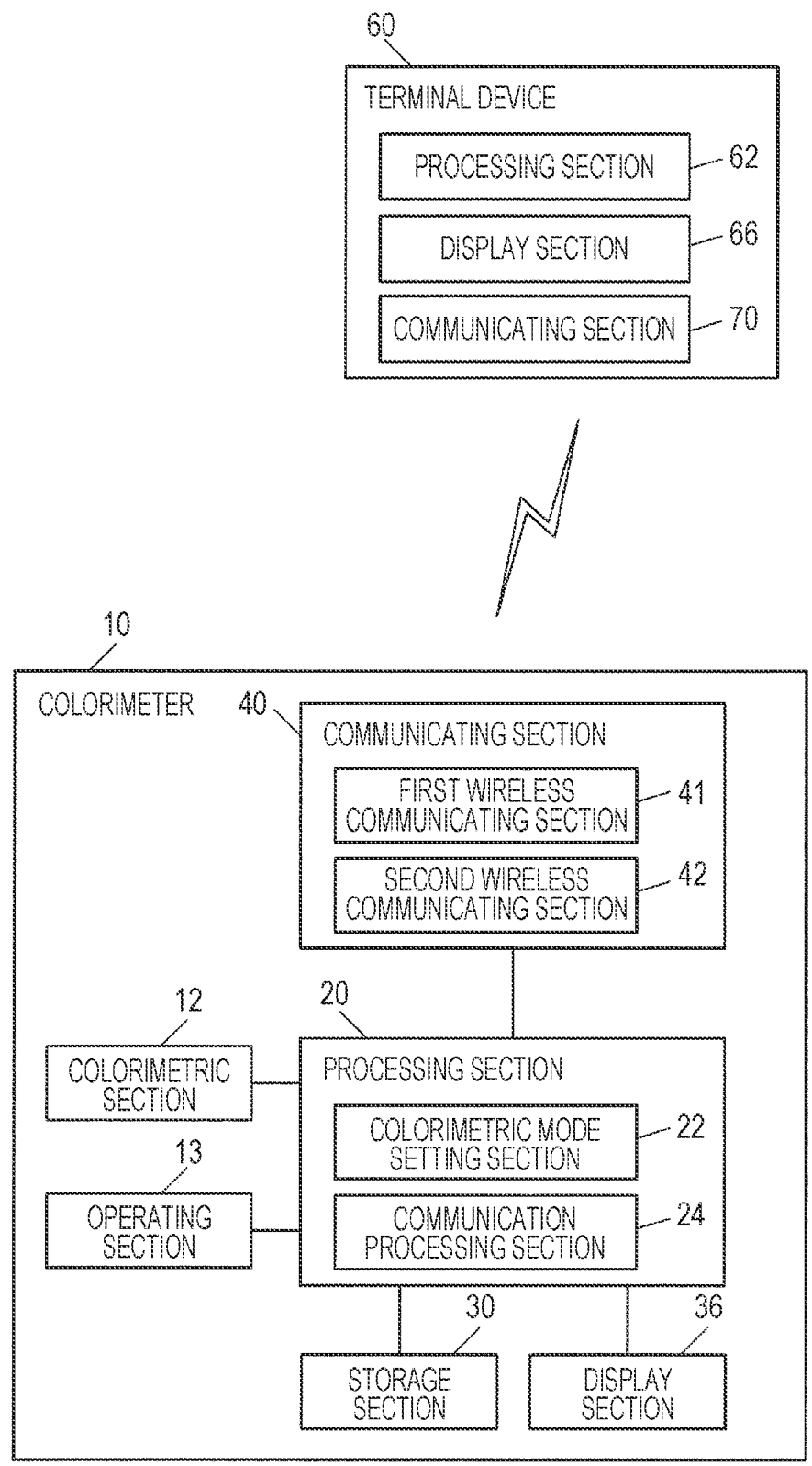
FIG. 1 is a diagram illustrating an example of the configuration of a colorimeter.

FIG. 1 is a view illustrating an example of the configuration of a colorimeter 10 according to the present embodiment. The colorimeter 10 includes a colorimetric section 12, a processing section 20, and a communicating section 40. The colorimeter 10 can include an operating section 13, a storage section 30, and a display section 36. The colorimeter 10 is connected to a terminal device 60 by wireless communication, and the terminal device 60 includes a processing section 62, a display section 66, and a communicating section 70. The colorimeter 10 and the terminal device 60 are not limited to the configuration illustrated in FIG. 1, and may be modified by omitting some components or adding another component.

The colorimetric section 12 performs colorimetry. For example, the colorimetric section 12 measures color of a target such as a print, and outputs a colorimetric value that is a colorimetric result. The colorimetric section 12 can be embodied as a colorimetric sensor or the like. A spectroscopic sensor can be used as the colorimetric sensor. For example, a spectroscopic sensor such as MEMS (Micro Electro Mechanical Systems) that can be produced by batch in a wafer-level process can be used as the colorimetric sensor. The spectroscopic sensor is a sensor for measuring a reflectance spectroscopic spectrum, for example. Specifically, the spectroscopic sensor can be configured of a light source such as a LED, an optical filter that inputs reflected light acquired by reflecting light from the light source on a measurement plane, and selects and switches wavelength, and a light receiving device that measures the amount of the reflected light passing through the optical filter. A Fabry Perot etalon element that is a wave filter utilizing multiple beam interference of two opposing reflectance planes can be used as the optical filter. The spectroscopic sensor measures a reflectance spectroscopic spectrum for measuring the amount of reflected light at each wavelength, thereby measuring target color. The colorimetric sensor that embodies the colorimetric section 12 is not limited to such spectroscopic sensor, and may be an image sensor. The colorimetric section 12 may measure color of reflected light as well as transmitted light.

The processing section 20 executes various processing such as processing of controlling each section of the colorimeter 10. For example, the processing section 20 controls the communicating section 40. The processing section 20 also inputs operational information from the operating section 13, reads information from the storage section 30, writes information to the storage section 30, displays information on the display section 36. The processing section 20 can be embodied as a processor. For example, each processing of the present embodiment can be achieved by the processor that operates based on information such as a program, and a memory that stores information such as a program. The memory is the storage section 30. The functions of the sections of the processor may be performed by individual pieces of hardware, or an integral piece of hardware. For example, the processor includes hardware, and the hardware can include at least one of a circuit for processing digital signals and a circuit for processing analog signals. For example, the processor can be configured of one or more circuit devices mounted on a circuit board, or one or more circuit elements. The processor may be a CPU (Central Processing Unit), for example. However, the processor is not limited to CPU, and may be various processors such as GPU (Graphics Processing Unit) and DSP (Digital Signal Processor). The processor may be also a hardware circuit such as ASIC (Application Specific Integrated Circuit). The processor may include an amplifying circuit or filter circuit that processes analog signals.

The operating section 13 is an operating interface that inputs the user's operating information. The operating section 13 can be embodied as an operating device. Using FIG. 2 described later as an example, the operating section 13 may be operating devices including a colorimetric button 14, a cross key 15, a power button 16, and a return button 17. However, the operating devices that realize the operating section 13 are not limited to the above-mentioned operating devices.

The storage section 30 stores various information. For example, the storage section 30 stores programs and data. For example, the storage section 30 functions as work areas of the processing section 20 and the communicating section 40. The storage section 30 such as a memory may be a semiconductor memory including SRAM (Static Random Access Memory), DRAM (Dynamic Random Access Memory), EEPROM (Electrically Erasable Programmable Read-Only Memory), a register, or a hard disc device. For example, the storage section 30 such as a memory stores computer-readable instructions, and the instructions are performed by the processing section 20 that is a processor such that the processing of each section of the processing section 20 is executed. The instructions described herein may be a set of instructions constituting a program, or instructions for instructing a hardware circuit of the processor.

The display section 36 displays various information to the user. The display section 36 can be embodied as various displays such as liquid crystal display and organic EL display. The display section 36 displays information necessary for the user to operate the colorimeter 10, various status information about the colorimeter 10, and the like.

The communicating section 40 is a communication interface that communicates with an external device such as the terminal device 60 in a wired or wireless manner. The communicating section 40 can be realized by a communicating IC (Integrated Circuit) such as a communicating ASIC or communicating processor, or a communicating firmware. The processing section 20 according to the present embodiment executes communication control processing such as information transmission/reception for the communicating section 40, such that the communicating section 40 transmits/receives information to/from the external device.

Then, the communicating section 40 includes a first wireless communicating section 41 and a second wireless communicating section 42. The first wireless communicating section 41 performs first wireless communication according to a first wireless communication standard. The second wireless communicating section 42 performs second wireless communication according to a second wireless communication standard. For example, each of the wireless communicating sections is embodied as one IC such that the first wireless communicating section 41 is realized by a first communicating IC, and the second wireless communicating section 42 is realized by a second communicating IC. In this case, the first communicating IC is provided with a first wireless circuit that realizes the first wireless communicating section 41 and the second communicating IC is provided with a second wireless circuit that realizes the second wireless communicating section 42. The first wireless circuit is provided with a physical layer circuit and a link layer circuit that perform first wireless communication, and the second wireless circuit is provided with a physical layer circuit and a link layer circuit that perform second wireless communication. Alternatively, the first wireless communicating section 41 and the second wireless communicating section 42 may be embodied as one communicating IC. In this case, this communication IC is provided with the first wireless circuit that realizes the first wireless communicating section 41 and the second wireless circuit that realizes the second wireless communicating section 42. Details of the first wireless communicating section 41 and the second wireless communicating section 42 will be described later.

The colorimeter 10 is communicably connected to the terminal device 60. The terminal device 60 is a communication terminal capable of wirelessly communicating information and is embodied as a smart phone, tablet PC (Personal Computer), or desktop PC. The terminal device 60 is communicably connected to the colorimeter 10, for example, by wireless communication.

The terminal device 60 includes the processing section 62, the display section 66, and the communicating section 70. The processing section 62 executes various processing such as the processing of controlling each section of the terminal device 60. For example, the processing section 62 controls the communicating section 70. The processing section 62 inputs operating information from an operating section not illustrated of the terminal device 60, reads information from a storage section not illustrated of the terminal device 60, writes information to the storage section, and displays information on the display section 66. The processing section 62 can be embodied as the processor. The display section 66 displays various information to the user.

The display section 66 can be embodied as various displays such as liquid crystal display and organic EL display. The communicating section 70 is a communication interface for communicating the external device such as the colorimeter 10 in a wireless or wired manner. Like the communicating section 40 of the colorimeter 10, the communicating section 70 includes a first wireless communicating section that performs first wireless communication according to the first wireless communication standard and a second wireless communicating section that performs second wireless communication according to the second wireless communication standard.

Figure 2:
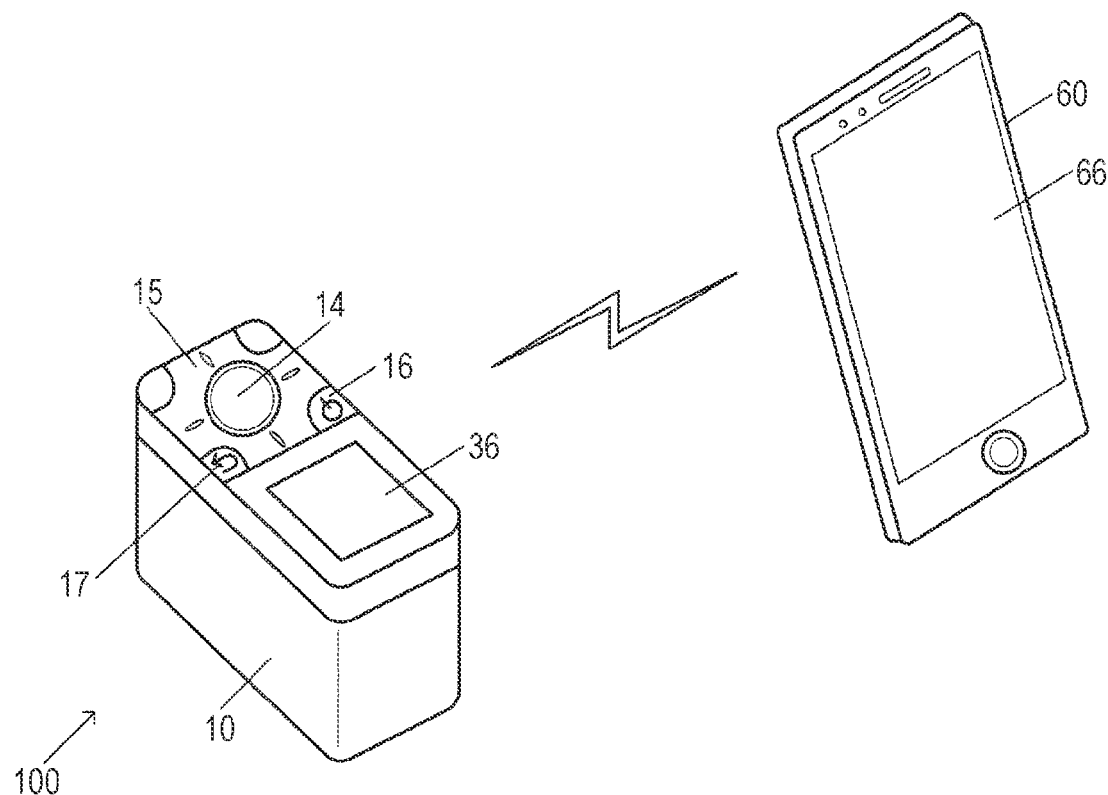
FIG. 2 is a diagram illustrating the outline of the colorimeter, and the configuration of a colorimetric system including the colorimeter and a terminal device.
Figure 3:
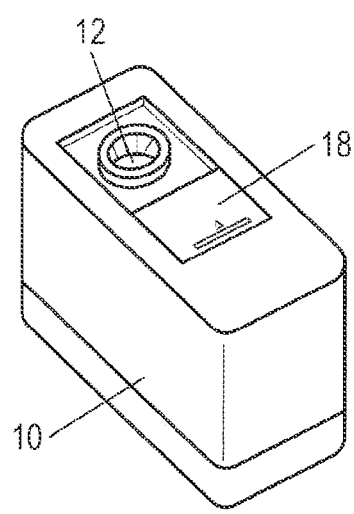
FIG. 3 is diagram illustrating the outline of the colorimeter.

FIGS. 2 and 3 are diagrams illustrating the outline of the colorimeter 10 and the terminal device 60, and an example of the configuration of a colorimetric system 100. As illustrated in FIG. 2, the colorimetric system 100 according to the present embodiment includes the colorimeter 10 and the terminal device 60 that communicates with the colorimeter 10. For example, the colorimeter 10 is connected to the terminal device 60 by the first wireless communication or the second wireless communication. The colorimetric system 100 enables the display section 66 of the terminal device 60 to display a colorimetric result of the colorimeter 10. The colorimetric system 100 enables the user to operate the terminal device 60, for example, causing the colorimeter 10 to perform colorimetry and setting the colorimeter 10 to various modes.

As illustrated in FIG. 2, the colorimeter 10 is substantially shaped like a cube, and the display section 36, the colorimetric button 14, and the cross key 15 are provided on its upper face. The power button 16 and the return button 17 are also provided on the upper face of the colorimeter 10. As illustrated in FIG. 3, the colorimetric section 12 and a shutter 18 are provided on a lower face of the colorimeter 10. The display section 36 displays various information to the user. The colorimetric button 14 is an operating device that instructs the colorimeter 10 to perform colorimetry by the user. For example, the user presses the colorimetric button 14, causing the colorimeter 10 to measure color using the colorimetric section 12. The cross key 15 is an operating device for instructing vertical and horizontal directions, for example. The power button 16 is a button for turning on/off the colorimeter 10. The return button 17 is a button for performing a so-called back operation, and the colorimetric section 12 is embodied as the colorimetric sensor as described above and is substantially circular in plan view, for example. During non-use of the colorimeter 10, the shutter 18 protects the colorimetric section 12. For example, while the colorimeter 10 is used, the user moves the shutter 18 toward the colorimetric section 12 to close the shutter 18, thereby preventing an external impact and so on from exerting on the colorimetric section 12.

The colorimeter 10 is handy type that can be grasped with one hand of the user to perform colorimetry. For example, the user grasps the side face of the colorimeter 10 with a thumb and a middle finger, a ring finger, or a little finger, presses the colorimetric button 14 with a forefinger, and indicates the direction using the cross key 15. The terminal device 60 is a communication terminal capable of communicating with the colorimeter 10, and is connected to the colorimeter 10 by wireless communication. The terminal device 60 has the display section 66, and is provided with an operating device such as an operating button. The display section 66 is, for example, a touch panel, and the user touches the display section 66 that is the touch panel for various operations.

As described above, the colorimeter 10 according to the present embodiment includes the colorimetric section 12 that perform colorimetry, the first wireless communicating section 41 that performs the first wireless communication according to the first wireless communication standard, the second wireless communicating section 42 that performs the second wireless communication according to the second wireless communication standard, and the processing section 20 that controls the first wireless communicating section 41 and the second wireless communicating section 42.

Then, in the colorimetry in a first colorimetric mode, the processing section 20 transmits colorimetric data acquired by the colorimetry in the first colorimetric mode by first wireless communication. For example, the processing section 20 acquires colorimetric data of the colorimetry in the first colorimetric mode using the colorimetric section 12. Then, the processing section 20 transmits the acquired colorimetric data to the terminal device 60 by the first wireless communication using the first wireless communicating section 41. In the colorimetry in a second colorimetric mode, the processing section 20 transmits the colorimetric data of the colorimetry in the second colorimetric mode by the second wireless communication. For example, the processing section 20 acquires colorimetric data of the colorimetry in the second colorimetric mode using the colorimetric section 12. Then, the processing section 20 transmits the acquired colorimetric data to the terminal device 60 by the second wireless communication using the second wireless communicating section 42. The processing of transmitting the colorimetric data by the first wireless communication and the processing of transmitting the colorimetric data by the second wireless communication are executed by a communication processing section 24 of the processing section 20.

The first wireless communication differs from the second wireless communication, for example, in wireless communication standard. For example, the first wireless communication differs from the second wireless communication in the mode of wireless communication. The first wireless communication may differ from the second wireless communication in standard version. Various types of wireless communication such as Bluetooth (Bluetooth is registered trademark. The same applies hereinafter), Wi-Fi (registered trademark. The same applies hereinafter), ZigBee (registered trademark), Wi-SUN (registered trademark), IP500 (registered trademark), wireless USB, and UWB are assumed as the first wireless communication and the second wireless communication. Then, the first wireless communication differs from the second wireless communication in communication speed. For example, the second wireless communication has a higher communication speed than the first wireless communication. The first wireless communication may differ from the second wireless communication in power consumption. For example, the first wireless communication has a smaller power consumption than the second wireless communication.

The first colorimetric mode differs from the second colorimetric mode in the method of measuring color of a target called patch. For example, the colorimetric method of the first colorimetric mode is different from that of the second colorimetric mode. Examples of the first colorimetric mode and the second colorimetric mode include a spot colorimetric mode, a line colorimetric mode, a first group colorimetric mode by spot colorimetry, and a second group colorimetric mode by line colorimetry. The first colorimetric mode differs from the second colorimetric mode in colorimetric data size acquired using the colorimetric section 12. The first colorimetric mode differs from the second colorimetric mode in how the user operates to perform colorimetry. The colorimetric modes are limited to two colorimetric modes and three or more colorimetric modes may be provided.

Specifically, according to the present embodiment, the second wireless communication has a higher communication speed than the first wireless communication, and the second colorimetric mode has a larger colorimetric data size than the first colorimetric mode. That is, when colorimetry is performed in the first colorimetric mode having a smaller colorimetric data size than the second colorimetric mode, the processing section 20 transmits colorimetric data by the first wireless communication having a lower communication speed than the second wireless communication. When colorimetry is performed in the second colorimetric mode having a larger colorimetric data size than the first colorimetric mode, the processing section 20 transmits colorimetric data by the second wireless communication having a higher communication speed than the first wireless communication. In this manner, since colorimetric data in the second colorimetric mode having a larger colorimetric data size can be transmitted by the second wireless communication having a higher communication speed, colorimetric data can be transmitted by the wireless communication having a suitable communication speed depending on the colorimetric mode.

In addition, according to the present embodiment, the first wireless communication is, for example, the Bluetooth communication, while the second wireless communication is, for example, the Wi-Fi communication. For example, the processing section 20 transmits colorimetric data by the Bluetooth communication when colorimetry is performed in the first colorimetric mode, and transmits colorimetric data by the Wi-Fi communication when colorimetry is performed in the second colorimetric mode. In this manner, colorimetric data acquired by the colorimetry in the first colorimetric mode can be transmitted by the Bluetooth communication having a lower communication speed but a smaller power consumption than the Wi-Fi communication. Colorimetric data acquired by the colorimetry in the second colorimetric mode can be transmitted by the Wi-Fi communication having a larger power consumption but a higher communication speed than the Bluetooth communication. Standards of various versions such as Ver.4.X, Ver.5.0, and their enhanced versions can be adopted as the Bluetooth standard. For example, the BLE (Bluetooth Low Energy) standard can be adopted as the Bluetooth standard. Standards of various versions such as IEEE802.11n, IEEE802.11ac, IEEE802.11ax, and their enhanced versions can be adopted as the Wi-Fi standard.

According to the present embodiment, the first colorimetric mode is the spot colorimetric mode, while the second colorimetric mode is the line colorimetric mode. For example, the processing section 20 transmits colorimetric data by the first wireless communication when colorimetry is performed in the spot colorimetric mode, and transmits colorimetric data by the second wireless communication when colorimetry is performed in the line colorimetric mode. As an example, the processing section 20 transmits colorimetric data by the first wireless communication such as the Bluetooth communication having a lower communication speed when colorimetry is performed in spot colorimetric mode, and transmits colorimetric data by the second wireless communication such as the Wi-Fi communication having a higher communication speed when colorimetry is performed in the line colorimetric mode. In this manner, in the spot colorimetric mode, the processing section 20 can transmit colorimetric data by wireless communication suitable for the spot colorimetric mode, and in the line colorimetric mode, the processing section 20 can transmit colorimetric data by wireless communication suitable for the line colorimetric mode. For example, the spot colorimetric mode is a mode of measuring one color by one user's operation of spot colorimetry. For example, the line colorimetric mode is a mode of measuring a plurality of colors aligned along a given line by the user's operation of line colorimetry. The operation of spot colorimetry is an operation of placing the colorimeter 10 at the position of a target for colorimetry and causing the colorimeter 10 to perform colorimetry. The operation of line colorimetry is an operation of causing the colorimeter 10 to perform colorimetry while moving the colorimeter 10 along a given line along a plurality of colors are aligned.

When the first colorimetric mode is set on a setting screen in the colorimetric mode, the processing section 20 transmits colorimetric data by the first wireless communication. For example, when the user selects the first colorimetric mode on the setting screen for the colorimetric mode, the processing section 20 transmits colorimetric data by the first wireless communication. When the second colorimetric mode is set on the setting screen for the colorimetric mode, the processing section 20 transmits colorimetric data by the second wireless communication. For example, when the user selects the second colorimetric mode on the setting screen for the colorimetric mode, the processing section 20 transmits colorimetric data by the second wireless communication. In this manner, for example, when the user sets the colorimetric mode on the setting screen for the colorimetric mode, colorimetric data acquired in the colorimetric mode is transmitted by wireless communication suitable for the colorimetric mode. The processing of setting the colorimetric mode is performed by a colorimetric mode setting section 22. For example, based on an user's input using the setting screen for the colorimetric mode or the like, the colorimetric mode setting section 22 sets the colorimetric mode to the first colorimetric mode or the second colorimetric mode.

In this case, the setting screen is, for example, a screen displayed on the display section 66 of the terminal device 60 that communicates with the colorimeter 10. That is, when the setting screen for the colorimetric mode is displayed on the display section 66 of the terminal device 60 and the user of the terminal device 60 selects the colorimetric mode on the displayed setting screen, colorimetric data is transmitted by wireless communication corresponding to the colorimetric mode. In this manner, the colorimetric system 100, the display section 66 of the terminal device 60 can be effectively used to display the setting screen for the colorimetric mode and select the colorimetric mode by the user's operation using the setting screen. Then, the colorimeter 10 can transmit colorimetric data to the terminal device 60 by suitable wireless communication corresponding to the selected colorimetric mode. The setting screen may be displayed on the display section 36 of the colorimeter 10.

According to the first colorimetric mode or the second colorimetric mode, the processing section 20 switches wireless communication between the first wireless communication and the second wireless communication. For example, the processing section 20 determines whether the current colorimetric mode is the first colorimetric mode or the second colorimetric mode, and according to a determination result, switches wireless communication from the first wireless communication to the second wireless communication, or from the second wireless communication to the first wireless communication. For example, when determining that the colorimetric mode becomes the second colorimetric mode during the first wireless communication, the processing section 20 switches wireless communication from the first wireless communication to the second wireless communication. When determining that the colorimetric mode becomes the first colorimetric mode during the second wireless communication, the processing section 20 switches wireless communication second wireless communication to the first wireless communication. In this manner, according to the colorimetric mode, the first wireless communication can be switched to the second wireless communication, or the second wireless communication can be switched to the first wireless communication, thereby achieving suitable switching of wireless communication corresponding to the colorimetric mode.

When the colorimetry in the second colorimetric mode is performed, the processing section 20 switches wireless communication from the first wireless communication to the second wireless communication. For example, when determining that the colorimetry in the second colorimetric mode is performed based on the setting of the colorimetric mode on the setting screen, voice input of the user, various operating inputs of the user, or system setting, the processing section 20 switches wireless communication from the first wireless communication to the second wireless communication. For example, when the colorimetry in the second colorimetric mode is performed in the case where the first wireless communication is set, the colorimeter 10 switches wireless communication from the first wireless communication to the second wireless communication. In this manner, when the colorimetry in the second colorimetric mode is performed, the colorimeter 10 can switch wireless communication from the first wireless communication to the second wireless communication, thereby transmitting colorimetric data acquired by the colorimetry in the second colorimetric mode by the second wireless communication.

When the colorimetry in the second colorimetric mode has been completed, the processing section 20 switches wireless communication from the second wireless communication to the first wireless communication. For example, the processing section 20 determines whether or not the colorimetry in the second colorimetric mode has been completed depending on whether or not the transmission of colorimetric data acquired by the colorimetry in the second colorimetric mode has been completed, or a user's indication of completion of the colorimetry in the second colorimetric mode. Then, when determining that the colorimetry in the second colorimetric mode has been completed, the processing section 20 switches wireless communication from the second wireless communication to the first wireless communication. In this manner, after the completion of transmission of the colorimetric data in the second colorimetric mode by the second wireless communication, the colorimeter 10 automatically switches wireless communication from the second wireless communication to the first wireless communication. Thus, the colorimeter 10 transmits, for example, colorimetric data in the second colorimetric mode by the second wireless communication. Upon completion of the transmission, the colorimeter 10 switches wireless communication to the default first wireless communication, improving convenience. For example, in the case where the first wireless communication has a smaller power consumption than the second wireless communication, power consumption of the colorimeter 10 can be reduced.

After turn-on of the colorimeter 10, the processing section 20 starts wireless communication by the first wireless communication. That is, at start, the processing section 20 sets the wireless communication to the first wireless communication. Then, when the colorimetry in the second colorimetric mode is performed, the processing section 20 switches wireless communication from the first wireless communication to the second wireless communication. That is, the processing section 20 switches the wireless communication set after turn-on as the first wireless communication to the second wireless communication. Then, upon completion of the transmission of colorimetric data by the second wireless communication, the processing section 20 switches wireless communication from the second wireless communication to the first wireless communication. That is, the processing section 20 switches wireless communication from the second wireless communication used for transmitting the colorimetric data in the second colorimetric mode to the first wireless communication. In this manner, the processing section 20 sets, for example, default wireless communication after turn-on to the first wireless communication. When the colorimetry in the second colorimetric mode is performed, the processing section 20 switches wireless communication from the first wireless communication to the second wireless communication, and when the colorimetry in the second colorimetric mode has been completed, the processing section 20 can switch wireless communication from the second wireless communication back to the original first wireless communication. Therefore, in the case where transmission of colorimetric data in the second colorimetric mode is required, wireless communication is set to the second wireless communication, and in other cases, wireless communication is set to the first wireless communication. Therefore, for example, in the case where the first wireless communication has a smaller power consumption than the second wireless communication, power consumption of the colorimeter 10 can be reduced.

2. Processing Example

Figure 4:
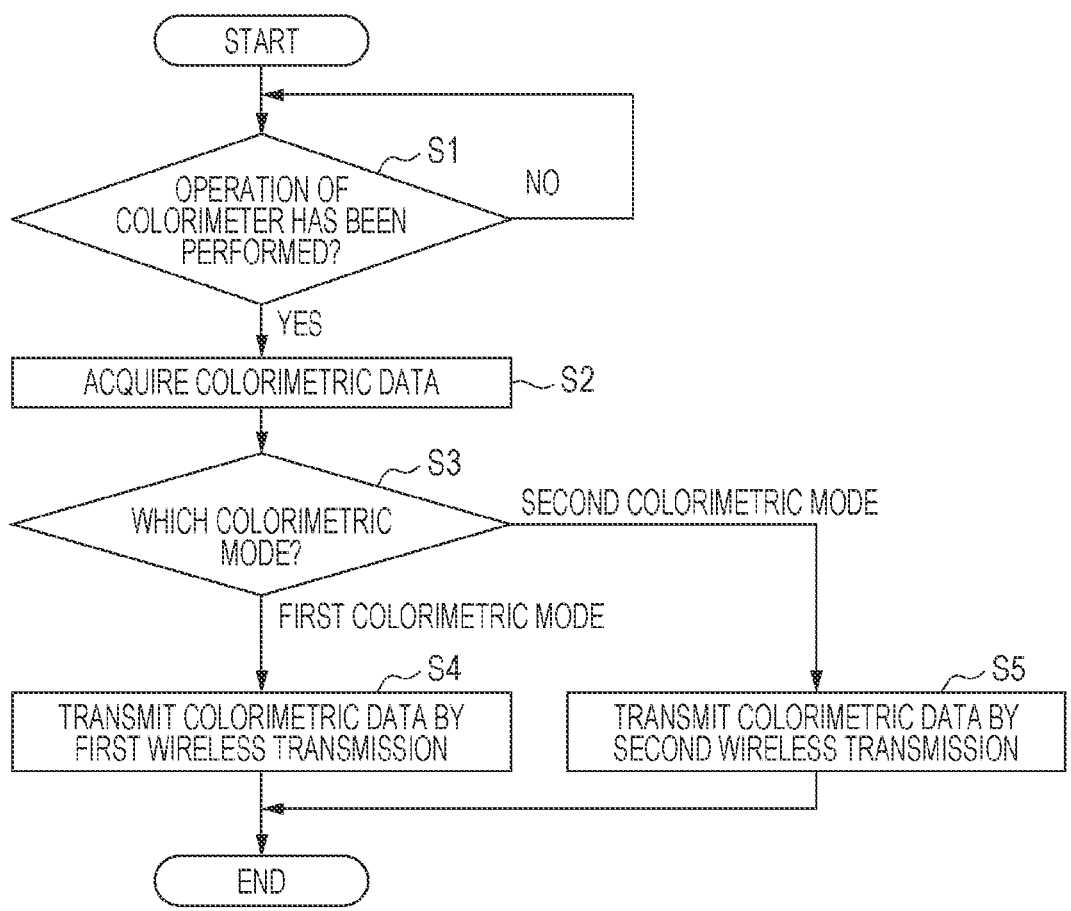
FIG. 4 is a flow chart describing processing according to the present embodiment.

Next, the processing according to the present embodiment will be specifically described below. FIG. 4 is a flow chart describing an example of basic processing according to the present embodiment. First, the processing section 20 determines whether or not an operation of colorimetry has been performed (Step S1). For example, the processing section 20 determines whether or not the colorimetric button 14 in FIG. 2 is pressed. Alternatively, the processing section 20 determines whether or not an icon of a below-mentioned colorimetric button C2 in FIG. 11 has been touched on a screen of the display section 66 of the terminal device 60. Thereby, the colorimetric section 12 measures color of the target, and the processing section 20 acquires colorimetric data based on a colorimetric value of the colorimetric section 12 (Step S2). Next, the processing section 20 determines which colorimetric mode of the colorimeter 10 is (Step S3). Then, when determining that the colorimetric mode is the first colorimetric mode, the processing section 20 transmits colorimetric data by the first wireless communication (Step S4). For example, the processing section 20 controls the first wireless communicating section 41 to transmit colorimetric data to the terminal device 60 by the first wireless communication according to the first wireless communication standard. On the contrary, when determining that the colorimetric mode is the second colorimetric mode, the processing section 20 transmits the colorimetric data by the second wireless communication (Step S5). For example, the processing section 20 controls the second wireless communicating section 42 to transmit colorimetric data to the terminal device 60 by the second wireless communication according to the second wireless communication standard.

As described above, in the colorimeter 10 and the communication method according to the present embodiment, when the user uses the colorimetric section 12 of the colorimeter 10 to perform colorimetry in the first colorimetric mode, the processing section 20 transmits colorimetric data acquired by the colorimetry in the first colorimetric mode by the first wireless communication, and when the user performs colorimetry in the second colorimetric mode, the processing section 20 transmits colorimetric data acquired by the colorimetry in the second colorimetric mode by the second wireless communication. In this manner, the colorimeter 10 can transmit colorimetric data acquired in each colorimetric mode according to the wireless communication corresponding to the colorimetric mode of the colorimeter 10, such that the colorimetric data is transmitted by the first wireless communication in the first colorimetric mode and by the second wireless communication in the second colorimetric mode. For example, it is given that the colorimetric data size in the second colorimetric mode is larger than the colorimetric data size in the first colorimetric mode, and the communication speed of the second wireless communication is higher than the communication speed of the first wireless communication. In this case, the colorimeter 10 transmits colorimetric data in the first colorimetric mode having a smaller colorimetric data size by the first wireless communication having a lower communication speed, and transmits colorimetric data in the second colorimetric mode having a larger colorimetric data size by the second wireless communication having a higher communication speed. It is given that the first wireless communication has a smaller power consumption than the second wireless communication. In this case, the colorimeter 10 transmits colorimetric data in the first colorimetric mode, which causes no problem even when transmitted with low power consumption, by the first wireless communication having a smaller power consumption, and transmits colorimetric data in the second colorimetric mode having a larger power consumption by the second wireless communication. In this manner, the colorimeter 10 and its communication method can transmit colorimetric data by suitable wireless communication corresponding to each colorimetric mode.

According to the present embodiment, the user presses the colorimetric button 14 of the colorimeter 10 to cause the colorimeter 10 to perform colorimetry. However, additionally or alternately, another trigger may be used to cause the colorimeter 10 to perform colorimetry. For example, according to an audio instruction of the user or an instruction from the terminal device 60, the colorimeter 10 may perform colorimetry. Further, the colorimeter 10 may detect pressing onto a target and perform colorimetry. Alternatively, the colorimeter 10 may repeat colorimetry until a predetermined limit time has elapsed. Then, when a color corresponding to a reference color is measured, the colorimeter 10 may regard the color as a colorimetry target, and when the color corresponding to the reference color is not measured, the colorimeter 10 may regard a color that is closest to the reference color among colors measured within the limit time as the colorimetry target.

Figure 5:
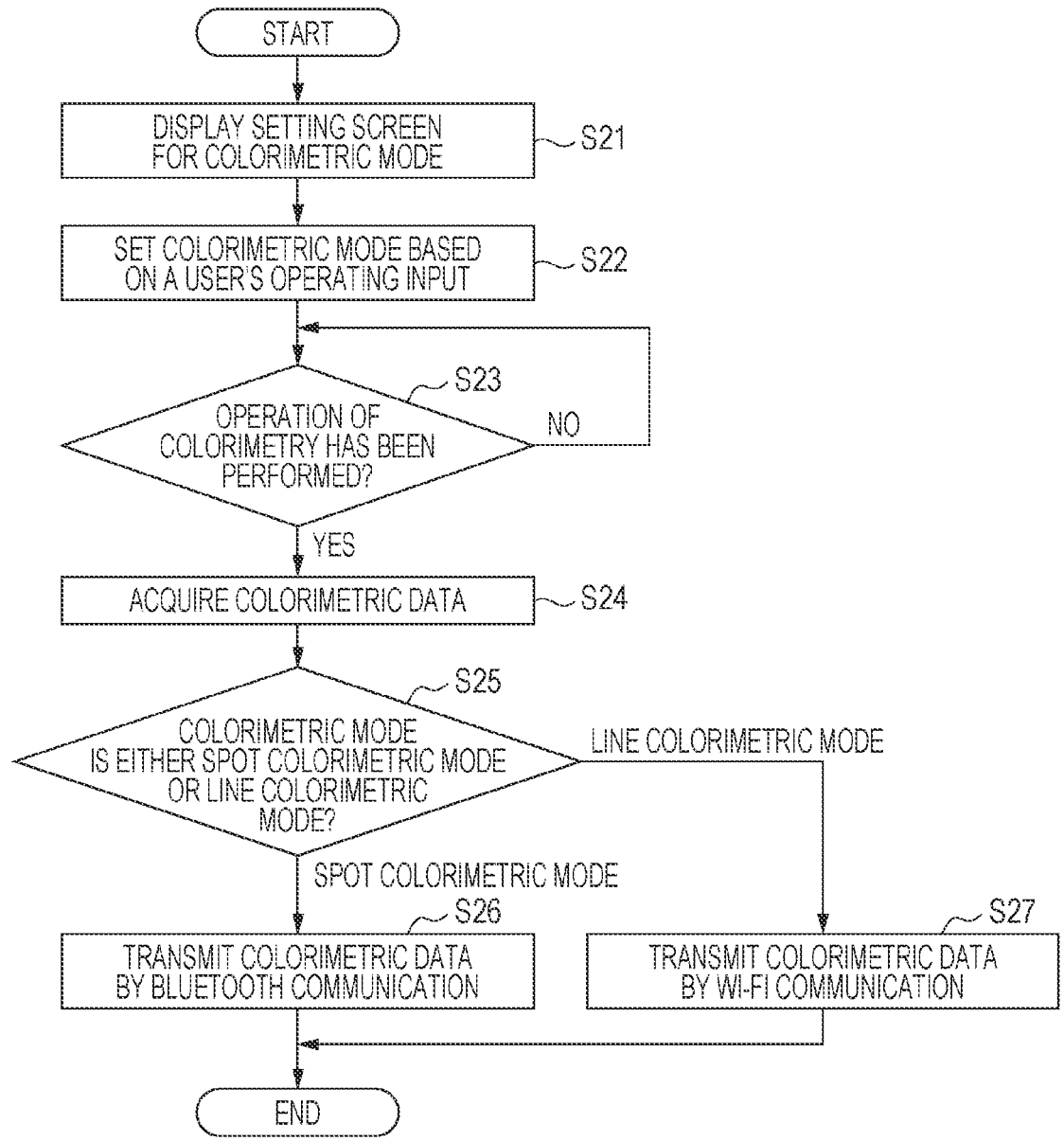
FIG. 5 is a flow chart describing specific processing according to the present embodiment.
Figure 6:
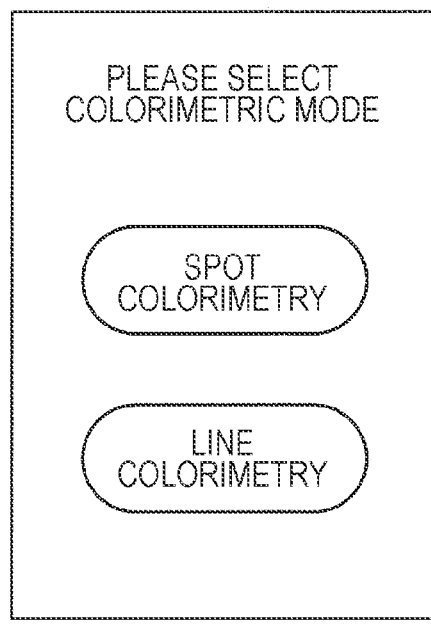
FIG. 6 is a diagram illustrating an example of a setting screen for a colorimetric mode.

FIG. 5 is a flow chart describing a specific example of the processing according to the present embodiment. First, the processing section 20 displays the setting screen for the colorimetric mode (Step S21). Specifically, the setting screen for the colorimetric mode in FIG. 6 is displayed, for example, on the display section 66 of the terminal device 60. Alternatively, the setting screen for the colorimetric mode may be displayed on the display section 36 of the colorimeter 10. Next, the processing section 20 sets the colorimetric mode of the colorimeter 10 according to a user's operating input (Step S22). For example, when the user selects spot colorimetry on the setting screen in FIG. 6, the colorimetric mode is set to the spot colorimetric mode, and when the user selects line colorimetry, the colorimetric mode is set to the line colorimetric mode.

Next, the processing section 20 determines whether or not an operation of colorimetry has been performed (Step S23), and when the operation of colorimetry has been performed, the processing section 20 acquires colorimetric data based on a colorimetric value of the colorimetric section 12 (Step S24). Then, the processing section 20 determines whether the colorimetric mode is the spot colorimetric mode or the line colorimetric mode (Step S25). Then, when determining that the colorimetric mode is the spot colorimetric mode, the processing section 20 transmits colorimetric data to the terminal device 60 by the Bluetooth communication (Step S26), and when determining that the colorimetric mode is the line colorimetric mode, the processing section 20 transmits colorimetric data to the terminal device 60 by the Wi-Fi communication (Step S27).

The colorimeter 10 is used in various places and thus, is demanded to be wirelessly used without any cable. Then, to suppress power consumption of the colorimeter 10, it is desirable to use the Bluetooth communication such as Bluetooth Low Energy (BLE) as wireless communication. However, Bluetooth such as BLE has a low power consumption, but a low communication speed, disadvantageously taking long time for communication in the case of large data size.

On the other hand, the colorimetry method of the colorimeter 10 includes modes such as spot colorimetry and line colorimetry. In the spot colorimetry, the colorimeter 10 performs colorimetry for one patch, and the colorimetric data size becomes about 4 KB, for example. On the contrary, in the line colorimetry, the colorimeter 10 continuously performs colorimetry for a plurality of patches, and in the case of colorimetry of 80 patches, the colorimetric data size becomes about 312 KB. Then, since the actual communication speed of Bluetooth of Ver 4.0 is 10 Kbps, when the colorimeter 10 attempts to transmit colorimetric data to the terminal device 60, the communication time becomes about 3 seconds in the spot colorimetry, and becomes about 250 seconds in the line colorimetry. For this reason, in handling communication of large data size, the colorimeter 10 requires wired communication using a USB cable or the like, but wired communication cannot satisfy the user's demand to use the colorimeter 10 without any cable.

Thus, the colorimeter 10 according to the present embodiment also performs the Wi-Fi communication in addition to the Bluetooth communication. Then, the colorimeter 10 switches wireless communication according to colorimetric data to be transmitted. For example, when the colorimeter 10 is used by wireless communication, the colorimeter 10 is connected to the terminal device 60 basically by the Bluetooth communication. Then, when a result of line colorimetry is transmitted to the terminal device 60, the processing section 20 switches wireless communication from the Bluetooth communication to the Wi-Fi communication. This enables the colorimeter 10 to be wirelessly used without lowering usability while suppressing power consumption as much as possible. For example, in the Wi-Fi communication of IEEE802.11ac, in the case of using one antenna, the actual communication speed becomes 110 Mbps. Accordingly, when the colorimeter 10 transmits colorimetric data of line colorimetry of 80 patches having colorimetric data size of about 312 KB to the terminal device 60 by the Wi-Fi communication as described above, the communication time becomes about 0.02 seconds. That is, the colorimeter 10 can greatly reduce the communication time, for example, from about 250 seconds in the Bluetooth communication to about 0.02 seconds, improving the user's convenience.

In this manner, the colorimeter 10 supports Bluetooth as well as Wi-Fi as interface for wireless connection and therefore, can wirelessly address communication of large data size without any inconvenience. According to the present embodiment, since the colorimeter 10 switches wireless communication using the colorimetric mode that is the colorimetry method, the colorimeter 10 can switch wireless communication more rapidly even during colorimetry, for example. As described above, according to the present embodiment, the colorimeter 10 can switch the interface for wireless communication depending on the type of the colorimetry method, thereby suppressing power consumption of the colorimeter 10 without lowering usability.

In updating firmware mounted in the colorimeter 10, the colorimeter 10 needs to communicate a data file with large data size. As an example, the colorimeter 10 needs to communicate data of about 1024 KB. For this reason, for example, in updating firmware, the Bluetooth communication can be automatically switched to the Wi-Fi communication, further improving convenience.

Figure 7:
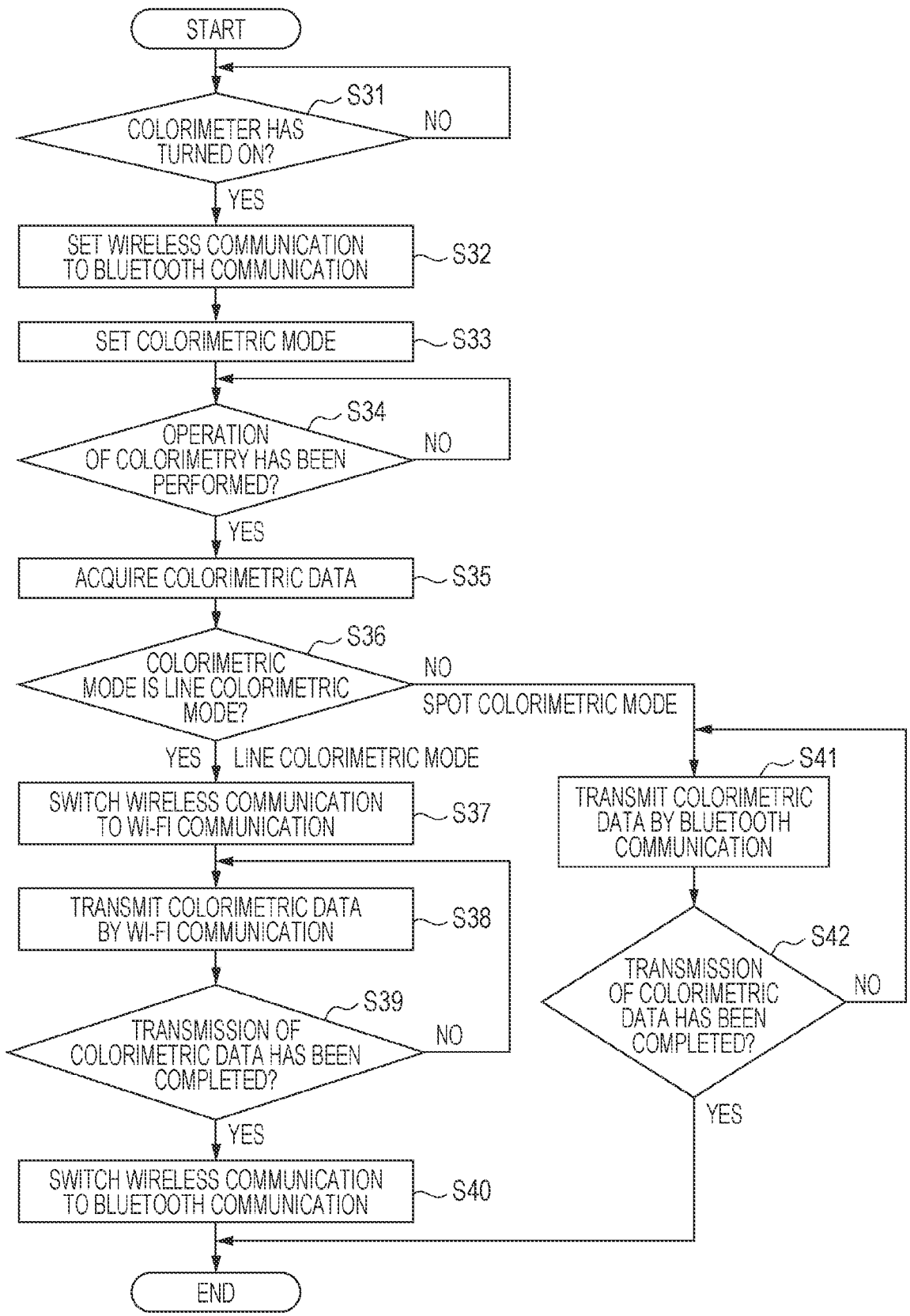
FIG. 7 is a flow chart describing detailed processing according to the present embodiment.

FIG. 7 is a flow chart describing an example of the processing according to the present embodiment in detail. First, the processing section 20 determines whether or not the colorimeter 10 has been turned on (Step S31). For example, the processing section 20 determines whether or not the power button 16 in FIG. 2 has been pressed to start the colorimeter 10. Then, when determining that the colorimeter has been turned on, the processing section 20 sets the wireless communication to the Bluetooth communication (Step S32). That is, at start, default wireless communication of the colorimeter 10 is set to the Bluetooth communication. Then, the processing section 20 sets the colorimetric mode (Step S33). The colorimetric mode may be set by user's selection on the setting screen for the colorimetric mode as illustrated in FIG. 6, or a user's predetermined operation using a user's voice input or operating device.

Next, the processing section 20 determines whether or not an operation of colorimetry has been performed (Step S34), and when the operation of colorimetry has been performed, acquires colorimetric data (Step S35). Then, the processing section 20 determines whether or not the colorimetric mode set in Step S33 is the line colorimetric mode (Step S36). When determining that the set colorimetric mode is the line colorimetric mode, the processing section 20 switches wireless communication to the Wi-Fi communication (Step S37). That is, the processing section 20 switches the wireless communication set as the Bluetooth communication in Step S32 to the Wi-Fi communication, and transmits colorimetric data by the Wi-Fi communication (Step S38). Then, the processing section 20 determines whether or not transmission of the colorimetric data has been completed (Step S39), and when the transmission has been completed, switches wireless communication to the Bluetooth communication (Step S40). That is, the processing section 20 switches wireless communication from the Bluetooth communication to the Wi-Fi communication in Step S37, transmits colorimetric data, and when the transmission has been completed, switches wireless communication to the Bluetooth communication that is default wireless communication.

On the contrary, when determining that the colorimetric mode is the spot colorimetric mode in Step S36, the processing section 20 transmits colorimetric data by the Bluetooth communication (Step S41), and when transmission of the colorimetric data is completed (Step S42), the processing section 20 terminates the processing. In this manner, the colorimeter 10 can transmit colorimetric data by the Bluetooth communication, relatively reducing power consumption as compared to the case of using the Wi-Fi communication.

As described above, according to the present embodiment, according to the first colorimetric mode or the second colorimetric mode, the processing section 20 switches wireless communication between the first wireless communication and the second wireless communication. For example, in the detailed example in FIG. 7, according to the spot colorimetric mode that is the first colorimetric mode or the line colorimetric mode that is the second colorimetric mode, the processing section 20 switches wireless communication between the Bluetooth communication that is the first wireless communication and the Wi-Fi communication that is the second wireless communication. For example, the processing section 20 determines whether the current colorimetric mode is the spot colorimetric mode or the line colorimetric mode, and according to a determination result, switches wireless communication from the Bluetooth communication to the Wi-Fi communication, or from the Wi-Fi communication to the Bluetooth communication. For example, when determining that the colorimetric mode becomes the line colorimetric mode during the Bluetooth communication, the processing section 20 switches wireless communication from the Bluetooth communication to the Wi-Fi communication. When determining that the colorimetric mode becomes the spot colorimetric mode during the Wi-Fi communication, the processing section 20 switches wireless communication from the Wi-Fi communication to the Bluetooth communication. In this manner, the colorimeter 10 can suitably switch wireless communication between the Bluetooth communication and the Wi-Fi communication according to the colorimetric mode. As described above, the first colorimetric mode and the second colorimetric mode are not limited to the spot colorimetric mode and the line colorimetric mode, and the first wireless communication and the second wireless communication are not limited to the Bluetooth communication or the Wi-Fi communication.

For example, as illustrated in Step S36 on FIG. 7, when the colorimetry in the line colorimetric mode that is the second colorimetric mode is performed, the processing section 20 switches wireless communication from the Bluetooth communication that is the first wireless communication to the Wi-Fi communication that is the second wireless communication. For example, in the case where the Bluetooth communication is set as default wireless communication in Step S32, when determining that the colorimetric mode is the line colorimetric mode in Step S36, the processing section 20 switches wireless communication from the Bluetooth communication to the Wi-Fi communication. In this manner, under normal situations, the colorimeter 10 can reduce power consumption by setting wireless communication to the Bluetooth communication. In the line colorimetric mode, the colorimeter 10 can transmit colorimetric data in the line colorimetric mode having a large data size to the terminal device 60 by the Wi-Fi communication having a high communication speed by setting wireless communication to the Wi-Fi communication.

Upon completion of the colorimetry in the line colorimetric mode, the processing section 20 switches wireless communication from the Wi-Fi communication to the Bluetooth communication. For example, when determining that transmission of colorimetric data by the Wi-Fi communication has been completed and the colorimetry in the line colorimetric mode has been completed in Step S39 in FIG.

7, the processing section 20 switches wireless communication from the Wi-Fi communication to the Bluetooth communication as illustrated in Step S40. In this manner, the colorimeter 10 transmits colorimetric data in the line colorimetric mode having a large data size by the Wi-Fi communication having a higher communication speed, and upon completion of the transmission of colorimetric data, the colorimeter 10 switches wireless communication to the Bluetooth communication having a lower communication speed and a smaller power consumption than the Wi-Fi communication. Therefore, the colorimeter 10 can prevent wireless communication from remaining to be the Wi-Fi communication to uselessly consume power.

As illustrated in Steps S31, S32 in FIG. 7, after turn-on of the colorimeter 10, the processing section 20 starts the Bluetooth communication. That is, at start, the processing section 20 sets the wireless communication to the Bluetooth communication. Then, following the colorimetry in the line colorimetric mode, the processing section 20 switches wireless communication from the Bluetooth communication to the Wi-Fi communication. That is, the processing section 20 switches the wireless communication set as the Bluetooth communication after turn-on to the Wi-Fi communication. Then, upon completion of the transmission of colorimetric data in the line colorimetric mode by the Wi-Fi communication, the processing section 20 switches wireless communication from the Wi-Fi communication to the Bluetooth communication. In this manner, the processing section 20 sets default wireless communication after turn-on to the Bluetooth communication. Then, when the colorimetry in the line colorimetric mode is performed, the processing section 20 switches from the Bluetooth communication to the Wi-Fi communication, and when the colorimetry in the line colorimetric mode is completed, the processing section 20 switches wireless communication from the Wi-Fi communication back to the default Bluetooth communication. Thus, when transmission of colorimetric data in the line colorimetric mode is required, the colorimeter 10 is set at the Wi-Fi communication having a higher communication speed, and when transmission of colorimetric data in any mode other than the line colorimetric mode, the colorimeter 10 is set at the Bluetooth communication having a lower communication speed and a smaller power consumption. Although the Wi-Fi communication has a large power consumption during a waiting period, the Bluetooth communication such as BLE can make power consumption during the waiting period extremely small. Thus, the colorimeter 10 sets the Wi-Fi communication during a period other than the line colorimetric mode, the Bluetooth communication during a period other than the line colorimetric mode, thereby further reducing power consumption of the colorimeter 10.

3. Colorimetric Mode

Figure 8:
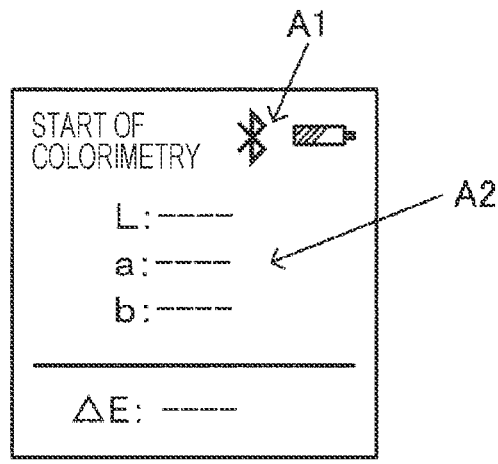

Next, the colorimetric modes of the colorimeter 10 according to the present embodiment will be described in detail. FIG. 8 illustrates an example of a screen displayed on the display section 36 of the colorimeter 10 after turn-on of the colorimeter 10 and before start of colorimetry. A1 in FIG. 8 indicates the status of the colorimeter 10, for example, remaining battery life and communication status. As illustrated in A1, after turn-on of the colorimeter 10, wireless communication is set to the Bluetooth communication. Due to that colorimetry is not started, as illustrated in A2, a Lab value that is a colorimetric result and the like have not been displayed yet.

Figure 9:
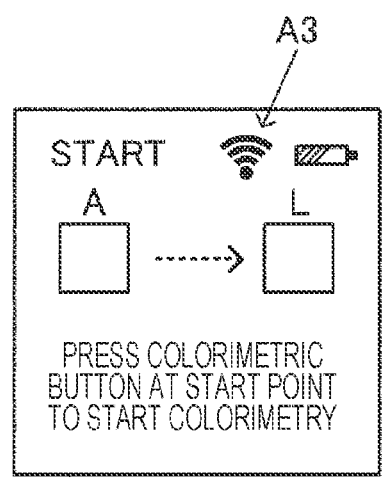
FIG. 9 is a diagram illustrating an example of a screen of a line colorimetric mode.

FIG. 9 illustrates an example a screen displayed on the display section 36 of the colorimeter 10 in the line colorimetric mode. In the line colorimetric mode, the user operates the colorimetric button 14 and slides the colorimeter 10 to measure a plurality of colors aligned along a line. For example, the user presses the colorimetric button 14 at a start point of the line and slides the colorimeter 10 along the line along which the plurality of colors are disposed, thereby performing line colorimetry. In this case, the user may press the colorimetric button 14 at the start point of the line and slides the colorimeter 10 and then, press again the colorimetric button 14 at an end point of the line. Alternatively, the user may slide the colorimeter 10 from the start point of the line while pressing the colorimetric button 14, and leave a pressing finger from the colorimetric button 14 at the end point of the line. One or more colors that are colorimetry targets of the colorimeter 10 are provided as patches, for example, on areas that are not used in the final product. For example, in textile printing, the user prints patches in a test area for inspection, and measures colors of the patches by using the colorimeter 10. Then, when the textile is cut to produce a product, the test area is discarded by cutting.

Then, according to the present embodiment, as illustrated in A3 in FIG. 9, in the line colorimetric mode, wireless communication is set to the Wi-Fi communication. For example, as illustrated in A1 in FIG. 8, at start after turn-on, the wireless communication is set to the Bluetooth communication, but in the line colorimetric mode, as illustrated in A3 in FIG. 9, wireless communication is switched from the Bluetooth communication to the Wi-Fi communication. Thereby, in the line colorimetric mode, when a plurality of colors are measured, the colorimeter 10 can transmit colorimetric data in the line colorimetric mode having a large data size by the Wi-Fi communication having a high communication speed.

On the other hand, in the spot colorimetric mode, the user does not measure a plurality of colors on the line at one time as in the line colorimetric mode, but presses the colorimetric button 14 for each color for colorimetry. In this case, colorimetric data having a small data size in the spot colorimetric mode is transmitted by the Bluetooth communication having a low communication speed.

Figure 10:
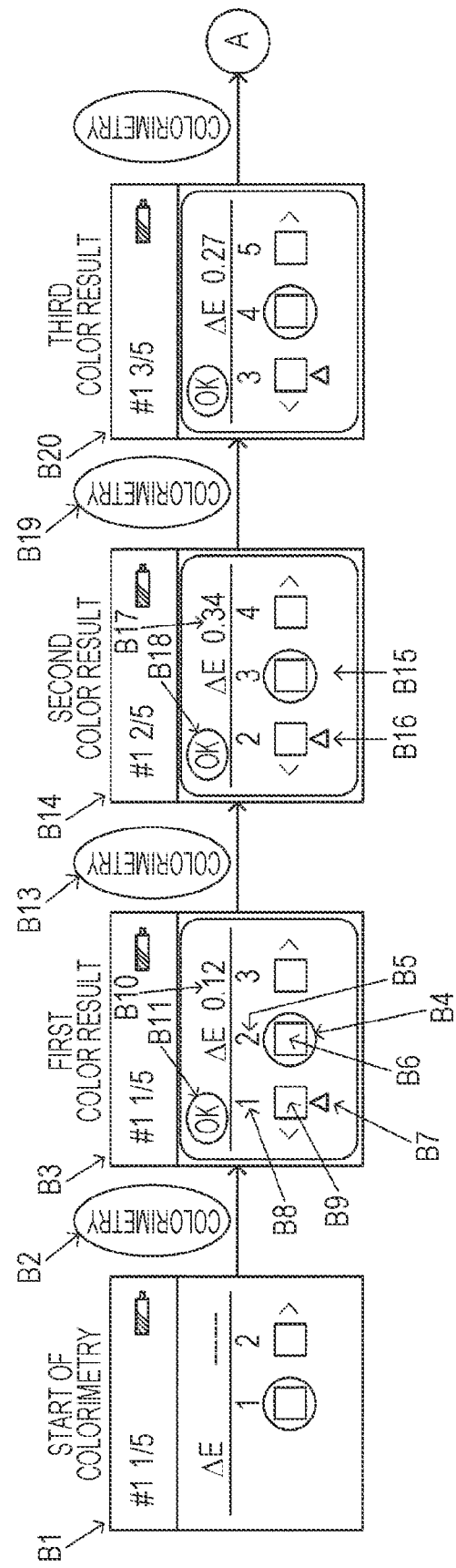
FIG. 10 is a diagram illustrating an example of a screen of a first group colorimetric mode.

In addition, according to the present embodiment, the group colorimetric mode of measuring colors of a plurality of colors is prepared. FIG. 10 illustrates an example of screens in the first group colorimetric mode of measuring colors of a color group. The example of the screens in FIG. 10 is displayed on the display section 36. In following description, a reference color to be compared is prepared, and in a color comparison mode, the reference color is compared with the measured color. For example, in the case where the user uses the colorimeter 10 to inspect the product, the color corresponding to the reference color is printed as a patch in the above-described test area. Then, the user performing the inspecting work places the colorimeter 10 in the test area and checks whether or not a color difference ΔE between the measured color and the reference color falls within an allowable value.

When the first group colorimetric mode is set as the colorimetric mode, the display section 36 displays the screen illustrated in B1 in FIG. 10. In the case state where the screen at start of colorimetry illustrated in B1 in FIG. 10 is displayed on the display section 36, when the colorimetric button 14 is pressed as illustrated in B2, the first color in a color group is measured and a colorimetric result screen of the first color as illustrated in B3 is displayed on the display section 36. On the screen of B3, a circular first marker for identifying a color to be measured next and number information about a color to be measured next are displayed as illustrated in B4, B5. The user can view the number information in B5 to identify what number the color to be measured next is in the color group. On the screen of B3, a second color in the color group is the color to be measured next. On the screen of B3, a general color of the color to be measured next as illustrated in B6 is displayed in the circular first marker illustrated in B4. On the screen of B3, a triangular second marker for identifying a color measured this time and number information about the color measured this time are displayed as illustrated in B7, B8. For example, on the screen of B3, the first color in the color group is the color measured this time. On the screen of B3, a general color of the color measured this time is displayed as illustrated in B9. On the screen of B3, the color difference ΔE and a determination result of the color difference ΔE are displayed as illustrated in B10, B11. The color difference ΔE illustrated in B10 is a color difference between the measured first color and the corresponding first reference color in the color group. The reference color is the color to be compared with the measured color. The determination result illustrated in B11 is a determination result with respect to an allowable value of the color difference ΔE, and here, is to be determined as OK since the color difference ΔE falls within the allowable value.

When the colorimetric button 14 is pressed as illustrated in B13 in the state where the screen of B3 is displayed on the display section 36, a second color in the color group is measured, and a colorimetric result screen of the second color is displayed as illustrated in B14. On the screen of B14, a circular first marker, number information, and general color of the color to be measured next, which are identification information about the color to be measured next, are displayed as illustrated in B15. As illustrated in B16, a triangular second marker, number information, and general color of the color measured this time, which are identification information about the color measured this time, are displayed. For example, on the screen of B14, a third color in the color group is a color to be measured next, and the second color in the color group is the color measured this time. On the screen of B14, the color difference ΔE and a determination result of the color difference ΔE are displayed as illustrated in B17, B18. Then, when the colorimetric button 14 is pressed as illustrated in B19 in the state where the screen in B14 is displayed on the display section 36, the color of the third color in the color group is measured, and a colorimetric result screen of the third color is displayed as illustrated in B20.

As described above, in the first group colorimetric mode in FIG. 10, colorimetry of the color group constituted of a plurality of colors is performed. The spot colorimetry is performed for each color in the color group. In such first group colorimetric mode, the processing section 20 transmits colorimetric data of the color group in the first group colorimetric mode by the second wireless communication such as the Wi-Fi communication having a high communication speed. For example, when the color group is configured of 16 colors, colorimetric data of 16 colors is transmitted by the second wireless communication. In this manner, colorimetric data of the color group constituted of a plurality of colors having a large data size can be transmitted by the second wireless communication having a high communication speed.

Figure 11:
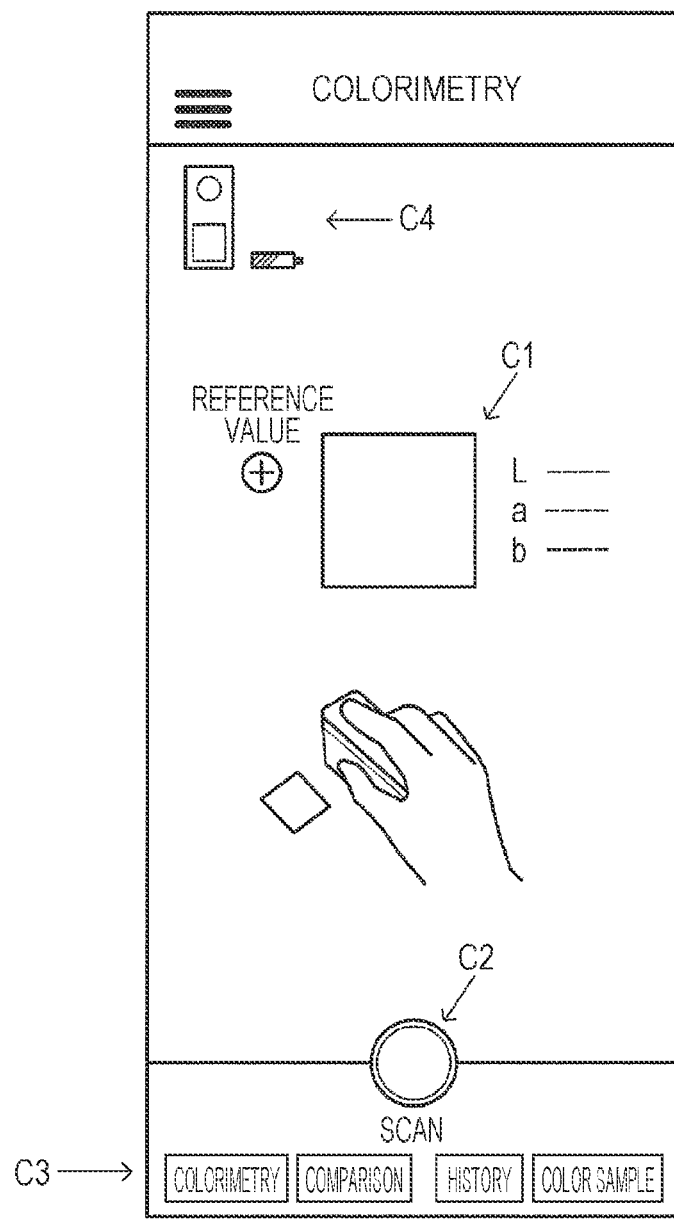
FIG. 11 is a diagram illustrating an example of a screen of a second group colorimetric mode.
Figure 12:
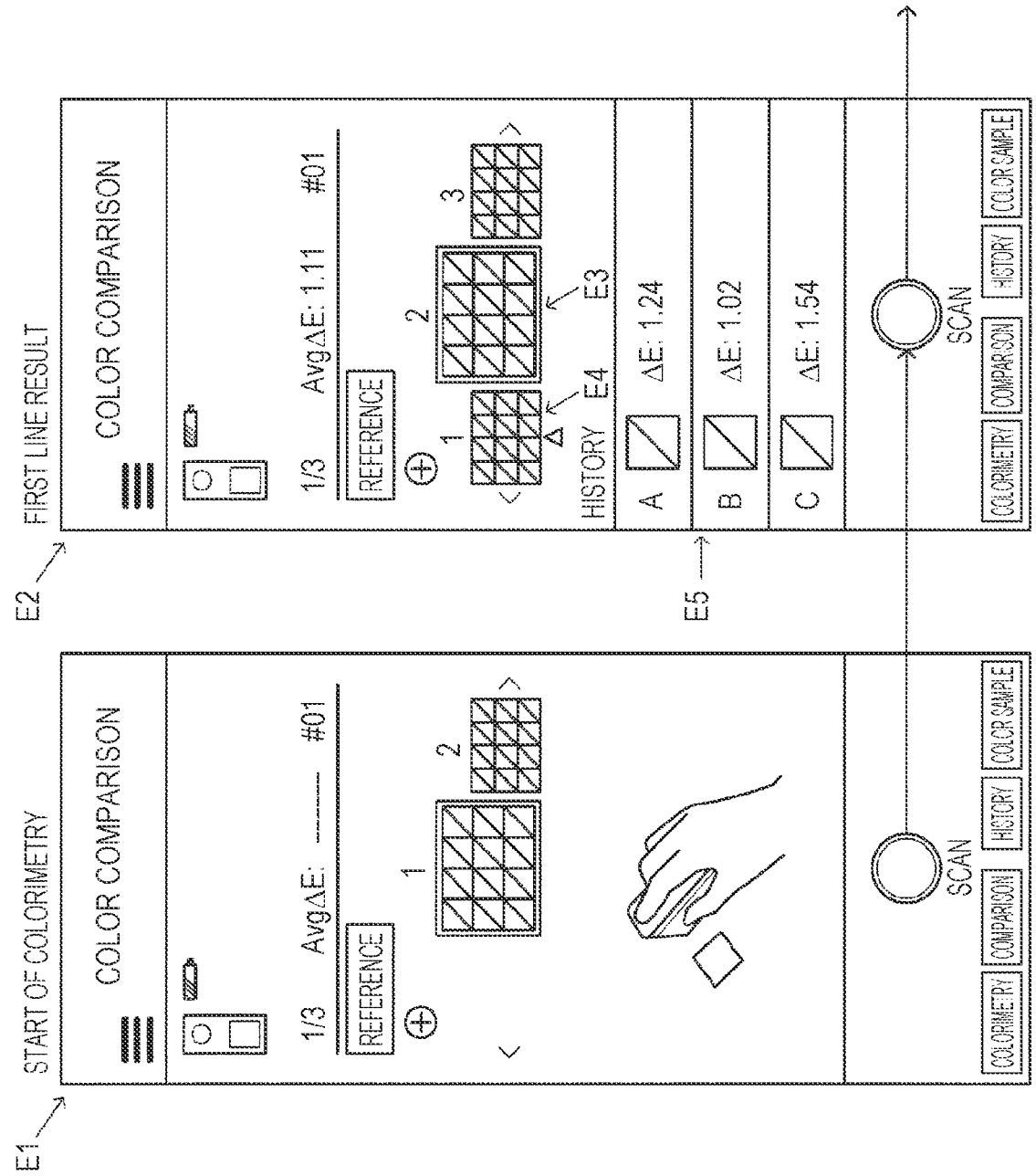
FIG. 12 is a diagram illustrating an example of the screen of a second group colorimetric mode.
Figure 13:
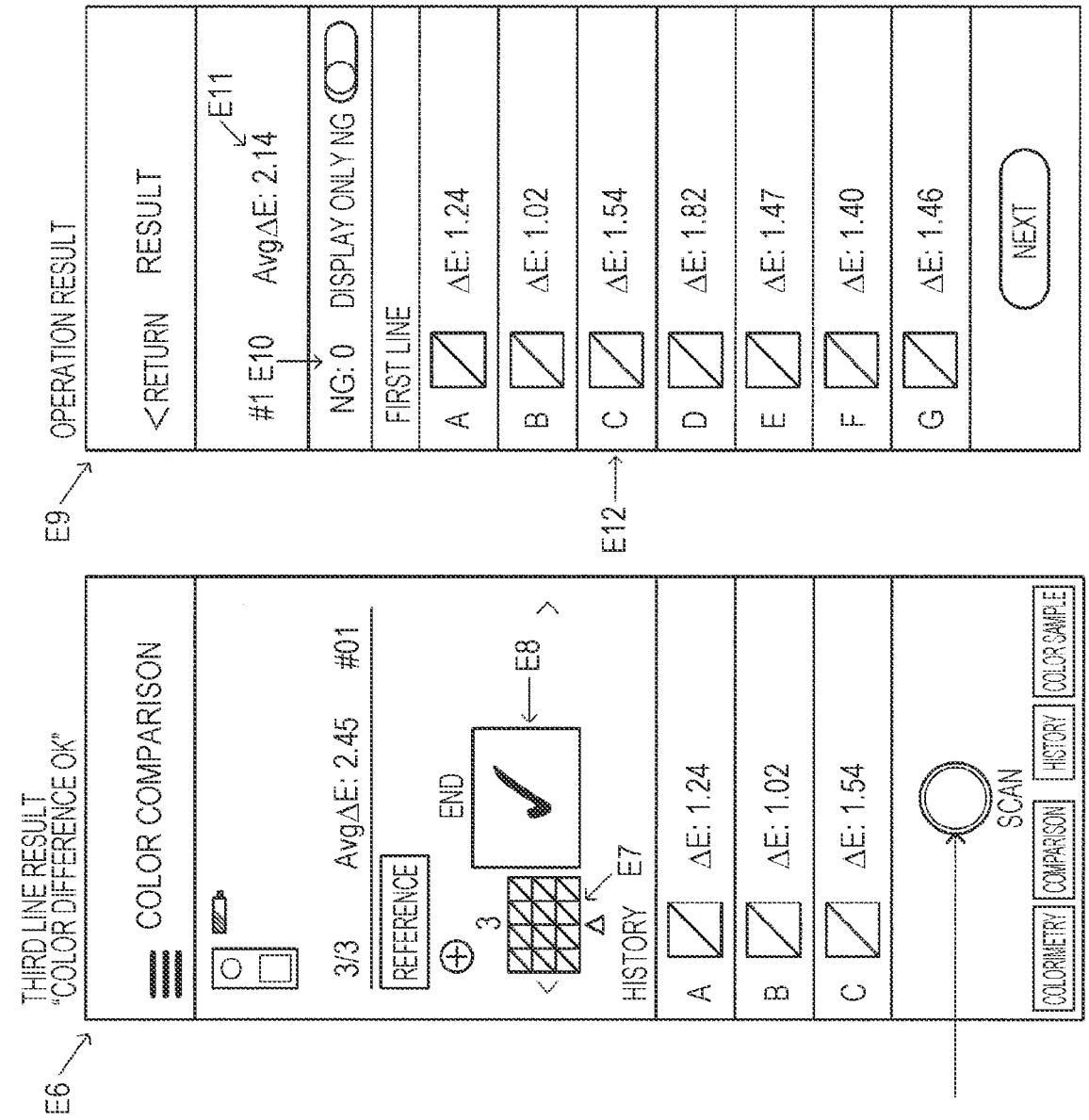
FIG. 13 is a diagram illustrating an example of a screen of the second group colorimetric mode.

FIGS. 11 to 13 illustrate examples of screens of the second group colorimetric mode of measuring colors of a color group constituted of a plurality of lines. In the second group colorimetric mode, the color group is configured of the plurality of lines, and the color of each line is measured by line colorimetry. Here, the colors of three lines in the color group are measured.

When the second group colorimetric mode is set as the colorimetric mode, the display section 36 displays the screen illustrated in FIG. 11. FIG. 11 illustrates the example of the screen displayed at start of colorimetry. The screen in FIG. 11 is displayed on, for example, the display section 66 of the terminal device 60. Since colorimetry has not been performed yet, no colorimetric result is displayed in C1 in FIG. 11. Then, the user touches an icon of a colorimetric button C2, causing the colorimeter 10 to perform colorimetry. Alternatively, the user can also press the colorimetric button 14 in FIG. 2, causing the colorimeter 10 to perform colorimetry. When the user selects an icon "Colorimetry", "Comparison", "History", or "Color Sample" in C3, the screen transitions to a colorimetric result screen, a color comparison screen, a history screen of previously measured colors, or a selection screen of color sample book. As illustrated in C4, status information such as the remaining battery life of the colorimeter 10 is displayed on the screen.

When an operation of colorimetry is performed after the screen at start of colorimetry is displayed on the display section 66 as illustrated in E1 in FIG. 12, colorimetry of a first line is performed. When colorimetry of the first line is completed, the processing section 20 switches wireless communication from the Bluetooth communication to the Wi-Fi communication, and colorimetric data of the first line is transmitted to the terminal device 60 by the Wi-Fi communication. The terminal device 60 that receives the colorimetric data of the first line displays the colorimetry result screen on the display section 66 as illustrated in E2. Then, a rectangular first marker for identifying the color of the line to be measured next and a general color of the color of the line to be measured next are displayed as illustrated in E3. A triangular second marker for identifying the color of the line measured this time and a general color of the color of the line measured this time are displayed as illustrated in E4. As illustrated in E5, each of the measured colors is also displayed. Here, one line is configured of, for example, 12 colors, and these 12 colors are measured by line colorimetry of the user as described with reference to FIG. 9. In FIG. 12, the general color of each of 12 colors is displayed in a frame of a square. Specifically, the square frame is divided into two by one diagonal line, the triangular frame located on the upper left side is filled with the general color of the reference color, and the triangular frame located on the lower right side is filled with the general color of the measured color.

As illustrated in E7, the screen in E6 in FIG. 13 displays that colorimetry of the last three lines has been performed. Then, as illustrated in E8, the screen indicates that there is no color group to be measured next. The operation result screen of E9 displays the number of cases of NG of 0 as illustrated in E10, and an average value of color differences of all lines as illustrated in E11. As illustrated in E12, the color difference ΔE and the general color of each color are displayed.

As described above, in the second group colorimetric mode in FIGS. 11 to 13, colorimetry is performed for the color group constituted of the plurality of lines is performed, and line colorimetry is performed for each line. In such second group colorimetric mode, the processing section 20 transmits colorimetric data of the color group in the second group colorimetric mode by the second wireless communication such as the Wi-Fi communication having a high communication speed. In this manner, colorimetric data of the color group including a plurality of lines having a large data size can be transmitted by the second wireless communication having a high communication speed more rapidly.

When colorimetry of all lines in the color group is completed, the processing section 20 switches wireless communication from the second wireless communication such as the Wi-Fi communication having a larger power consumption to the first wireless communication such as the Bluetooth communication having a larger power consumption. In this manner, after colorimetric data of the color group having a large data size is transmitted by the second wireless communication having a high communication speed but large power consumption and transmission of colorimetric data of colors of all lines in the color group is completed, the second wireless communication can be switched to the first wireless communication having a low communication speed but small power consumption. Thereby, the colorimeter 10 can achieve both of transmission of colorimetric data at a suitable communication speed and reduction in power consumption of the colorimeter 10. In the second group colorimetric mode of measuring colors of the color group including a plurality of lines, each time colorimetry of each of the plurality of lines is completed, colorimetric data is transmitted by the second wireless communication. However, after colorimetry of all lines constituting the group is completed, colorimetric data may be transmitted by the second wireless communication.

As described above, the colorimeter according to the present embodiment includes: a colorimetric section that performs colorimetry; a first wireless communicating section that performs first wireless communication according to a first wireless communication standard; a second wireless communicating section that performs second wireless communication according to a second wireless communication standard; and a processing section that controls the first wireless communicating section and the second wireless communicating section. The processing section transmits colorimetric data acquired by the colorimetry in the first colorimetric mode by the first wireless communication when colorimetry in a first colorimetric mode is performed. The processing section also transmits colorimetric data acquired by the colorimetry in the second colorimetric mode by the second wireless communication when colorimetry in a second colorimetric mode is performed.

As described above, according to the present embodiment, colorimetric data in the first colorimetric mode is transmitted by the first wireless communication, and colorimetric data in the second colorimetric mode is transmitted by the second wireless communication. This can achieve the colorimeter capable of transmitting colorimetric data by suitable wireless communication corresponding to each colorimetric mode.

Preferably, in the present embodiment, the second wireless communication is wireless communication having a higher communication speed than the first wireless communication, and the second colorimetric mode has a larger colorimetric data size than the first colorimetric mode.

In this manner, since colorimetric data having in the second colorimetric mode having a large colorimetric data size can be transmitted by the second wireless communication having a high communication speed, colorimetric data can be transmitted by wireless communication having a communication speed suitable for the colorimetric mode.

Preferably, in the present embodiment, the first wireless communication is Bluetooth communication, and the second wireless communication is Wi-Fi communication.

In this manner, colorimetric data acquired by the colorimetry in the first colorimetric mode can be transmitted by the Bluetooth communication having a lower communication speed but smaller power consumption than the Wi-Fi communication. Colorimetric data acquired by the colorimetry in the second colorimetric mode can be transmitted by the Wi-Fi communication having a larger power consumption but higher communication speed than the Bluetooth communication.

Preferably, in the present embodiment, the first colorimetric mode is a spot colorimetric mode, and the second colorimetric mode is a line colorimetric mode.

In this manner, in the spot colorimetric mode, colorimetric data can be transmitted by wireless communication suitable for the spot colorimetric mode, and in the line colorimetric mode, colorimetric data can be transmitted by wireless communication suitable for the line colorimetric mode.

Preferably, in the present embodiment, the processing section, when the first colorimetric mode is set on a setting screen for the colorimetric mode, transmits the colorimetric data by the first wireless communication, and when the second colorimetric mode is set on the setting screen for the colorimetric mode, transmits the colorimetric data by the second wireless communication.

In this manner, when the colorimetric mode is set on the setting screen for the colorimetric mode, colorimetric data can be transmitted by wireless communication suitable for the set colorimetric mode.

Preferably, in the present embodiment, the setting screen is a screen displayed on a display section of a terminal device that communicates with the colorimeter.

In this manner, the display section of the terminal device can be used to display the setting screen for the colorimetric mode, and the user can select the colorimetric mode using the setting screen, and transmit colorimetric data by wireless communication corresponding to the selected colorimetric mode.

Preferably, in the present embodiment, the processing section switches wireless communication between the first wireless communication and the second wireless communication according to the first colorimetric mode or the second colorimetric mode.

In this manner, according to the colorimetric mode, the first wireless communication can be switched to the second wireless communication and the second wireless communication can be switched to the first wireless communication, thereby achieving suitable switching of wireless communication corresponding to the colorimetric mode.

Preferably, in the present embodiment, when colorimetry in the second colorimetric mode is performed, the processing section switches wireless communication from the first wireless communication to the second wireless communication.

In this manner, when colorimetry in the second colorimetric mode is performed, the first wireless communication can be transmitted to the second wireless communication such that colorimetric data can be transmitted by the second wireless communication.

Preferably, in the present embodiment, when colorimetry in the second colorimetric mode was completed, the processing section switches wireless communication from the second wireless communication to the first wireless communication.

In this manner, after colorimetric data in the second colorimetric mode is transmitted by the second wireless communication, the second wireless communication is switched to the first wireless communication, improving convenience.

Preferably, in the present embodiment, the processing section starts wireless communication in the first wireless communication after turn-on of the colorimeter, switches wireless communication from the first wireless communication to the second wireless communication when colorimetry in the second colorimetric mode is performed, and switches wireless communication from the second wireless communication to the first wireless communication when transmission of the colorimetric data by the second wireless communication was completed.

In this manner, in the case where wireless communication after turn-on is set to the first wireless communication and colorimetry in the second colorimetric mode is performed, when the first wireless communication is switched to the second wireless communication and the colorimetry in the second colorimetric mode is completed, the second wireless communication can be switched to the original first wireless communication.

A colorimetric system according to the present embodiment includes the above-described colorimeter and a terminal device that communicate with the colorimeter.

With such colorimetric system, for example, the user can operate the terminal device, causing the colorimeter to perform colorimetry and setting the colorimeter to various modes.

A communication method of a colorimeter according to the present embodiment includes: when colorimetry is performed in a first colorimetric mode using a colorimetric section of the colorimeter, transmitting colorimetric data acquired by the colorimetry in the first colorimetric mode by first wireless communication, the first wireless communication being wireless communication according to a first wireless communication standard, when colorimetry is performed in a second colorimetric mode using the colorimetric section, transmitting colorimetric data acquired by the colorimetry in the second colorimetric mode by second wireless communication, the second wireless communication being wireless communication according to a second wireless communication standard.

In this manner, the communication method capable of transmitting colorimetric data by wireless communication suitable for each colorimetric mode can be realized.

Although the present embodiment has been described above in detail, those skilled in this art will readily understand that many modifications can be made so as not to substantially deviate from new matters and effects of the present embodiment. Therefore, all of these modifications fall within the scope of the present disclosure. For example, any term described in the specification or drawings at least once along with a different more broad or synonymous term can be replaced with the different term at any location in the specification or drawings. All combinations of the present embodiment and the modifications fall within the scope of the present disclosure. The configurations of the colorimeter, the terminal device, and the colorimetric system, and the colorimetry method are not limited to those described in the present embodiment, and may be modified in various manner.

What is claimed is:
1. A colorimeter comprising:
a colorimetric sensor that performs colorimetry;
a first wireless communicating interface that performs first wireless communication with a terminal device according to a first wireless communication standard, the terminal device being wirelessly connected to the colorimeter;
a second wireless communicating interface that performs second wireless communication with the terminal device according to a second wireless communication standard; and
a processor that controls the first wireless communicating interface and the second wireless communicating interface,
the terminal device setting as a colorimetric mode one of a first colorimetric mode and a second colorimetric mode, the first colorimetric mode and the second colorimetric mode being different from each other in how the colorimetric sensor performs the colorimetry,
the processor determining whether the colorimetric mode set by the terminal device is the first colorimetric mode or the second colorimetric mode,
upon determining that the colorimetric mode set by the terminal device is the first colorimetric mode, the processor transmitting, by the first wireless communication, to the terminal device colorimetric data acquired by the colorimetry performed in the first colorimetric mode, and
upon determining that the colorimetric mode set by the terminal device is the second colorimetric mode, the processor transmitting, by the second wireless communication, to the terminal device colorimetric data acquired by the colorimetry performed in the second colorimetric mode.

2. The colorimeter according to claim 1, wherein
the second wireless communication is wireless communication having a higher communication speed than the first wireless communication, and
the second colorimetric mode has a larger colorimetric data size than the first colorimetric mode.

3. The colorimeter according to claim 2, wherein
the first wireless communication is Bluetooth communication, and
the second wireless communication is Wi-Fi communication.

4. The colorimeter according to claim 2, wherein
the first colorimetric mode is a spot colorimetric mode, and
the second colorimetric mode is a line colorimetric mode.

5. The colorimeter according to claim 1, wherein
the colorimetric mode is set on a setting screen for the colorimetric mode.

6. The colorimeter according to claim 5, wherein the setting screen is a screen displayed on a display of the terminal device that communicates with the colorimeter.

7. The colorimeter according to claim 1, wherein the processor switches wireless communication between the first wireless communication and the second wireless communication according to the first colorimetric mode or the second colorimetric mode.

8. The colorimeter according to claim 7, wherein when colorimetry in the second colorimetric mode is performed, the processor switches wireless communication from the first wireless communication to the second wireless communication.

9. The colorimeter according to claim 7, wherein when colorimetry in the second colorimetric mode was completed, the processor switches wireless communication from the second wireless communication to the first wireless communication.

10. The colorimeter according to claim 7, wherein
the processor
 starts wireless communication in the first wireless communication after turn-on of the colorimeter,
 switches wireless communication from the first wireless communication to the second wireless communication when colorimetry in the second colorimetric mode is performed, and
 switches wireless communication from the second wireless communication to the first wireless communication when transmission of the colorimetric data by the second wireless communication was completed.

11. A colorimetric system comprising:
 the colorimeter according to claim 1; and
 the terminal device that wirelessly connected to the colorimeter to communicate with the colorimeter.

12. A communication method of a colorimeter, the method comprising:
 determines, by a processor, whether a colorimetric mode for performing colorimetry using a colorimetric sensor of the colorimeter, which is set at a terminal device wirelessly connected to the colorimeter, is a first colorimetric mode or a second colorimetric mode, the first colorimetric mode and the second colorimetric mode being different from each other in how the colorimetry is performed by the colorimetric sensor;
 upon determining that the colorimetric mode is the first colorimetric mode, transmitting, by the processor, using first wireless communication, to the terminal device colorimetric data acquired by the colorimetry performed in the first colorimetric mode, the first wireless communication being wireless communication according to a first wireless communication standard; and
 upon determining that the colorimetric mode is the second colorimetric mode, transmitting, by the processor, using second wireless communication, to the terminal device colorimetric data acquired by the colorimetry performed in the second colorimetric mode, the second wireless communication being wireless communication according to a second wireless communication standard.

* * * * *